(12) United States Patent
Sperau et al.

(10) Patent No.: US 12,307,413 B2
(45) Date of Patent: May 20, 2025

(54) METHOD AND SYSTEM FOR AUTOMATED VEHICLE TRANSPORTATION

(71) Applicant: Autosled, Inc., Monkton, MD (US)

(72) Inventors: Dan Sperau, Monkton, MD (US); David Sperau, Washington, DC (US); Kimani Clark, Washington, DC (US)

(73) Assignee: Autosled, Inc., Monkton, MD (US)

( * ) Notice: Subject to any disclaimer, the term of this patent is extended or adjusted under 35 U.S.C. 154(b) by 0 days.

(21) Appl. No.: 18/350,037

(22) Filed: Jul. 11, 2023

(65) Prior Publication Data

US 2023/0351316 A1 Nov. 2, 2023

Related U.S. Application Data

(63) Continuation of application No. 16/664,353, filed on Oct. 25, 2019, now Pat. No. 11,741,423.

(60) Provisional application No. 62/751,228, filed on Oct. 26, 2018.

(51) Int. Cl.
*G06Q 10/00* (2023.01)
*G06Q 10/08* (2023.01)
*G06Q 10/0835* (2023.01)
*G06Q 10/0875* (2023.01)
*G06Q 20/10* (2012.01)
*G06Q 30/04* (2012.01)
*G07C 9/29* (2020.01)

(52) U.S. Cl.
CPC ....... *G06Q 10/08355* (2013.01); *G06Q 10/08* (2013.01); *G06Q 10/0875* (2013.01); *G06Q 20/102* (2013.01); *G06Q 30/04* (2013.01); *G07C 9/29* (2020.01)

(58) Field of Classification Search
CPC ... G06Q 20/102; G06Q 30/04; G06Q 10/0832
See application file for complete search history.

(56) References Cited

U.S. PATENT DOCUMENTS

| 8,768,565 B2 * | 7/2014 | Jefferies | G07C 5/0808 |
| | | | 701/32.7 |
| 2014/0330738 A1 * | 11/2014 | Falcone | G06Q 10/08355 |
| | | | 705/338 |
| 2018/0096300 A1 * | 4/2018 | Boye | G06Q 10/067 |

OTHER PUBLICATIONS https://runbuggy.com.
https://www.haully.com.
PCT/US19/058183—IST & Written Opinion mailed Feb. 11, 2020.

* cited by examiner

*Primary Examiner* — Rokib Masud
(74) *Attorney, Agent, or Firm* — Edell, Shapiro & Finnan, LLC

(57) ABSTRACT

A method and system for automated vehicle transportation is disclosed that allows a car shipper, such as a car dealer, to ship a car automatically from a computer or smart phone, and have the car accepted directly electronically by an auto transport trucker on a smartphone to pick up and deliver. The user by enters the vehicle on a website or mobile application, and the auto transporter selects the car for pick up by tapping on a mobile application on a smartphone. The transaction is handled automatically by the system, and manual communication such as phone calls and faxes and paperwork are not required. The system also tracks the location of the vehicle via the transporter's smartphone and displays the real-time location to the customer. The payment may be collected electronically from the customer, and automatically paid to the transporter electronically. A video bill of lading is also provided.

20 Claims, 24 Drawing Sheets

SHIPMENTS  BILLING  MANAGE TEAM  SUPPORT  WELCOME, JEREMY STEVENS ▾

NEW SHIPMENT
PICKUP
ADDRESS LINE 1 —502

ADDRESS LINE 2

CITY   STATE   ZIP

CONTACT NAME —504

PHONE —506

PICKUP INSTRUCTIONS/RESTRICTIONS —508
OPTIONAL

DROPOFF
ADDRESS LINE 1 —510

ADDRESS LINE 2

CITY   STATE   ZIP

CONTACT NAME —512

PHONE —514

PICKUP INSTRUCTIONS/RESTRICTIONS —516
OPTIONAL

VEHICLES
NO VEHICLES
ADD VEHICLE —518

REVIEW SHIPMENT

SERVICES
FOR DEALERS
FOR TRANSPORTERS

SHIPMENTS  BILLING  MANAGE TEAM  SUPPORT                    WELCOME, JEREMY STEVENS ▾

ADD VEHICLE
VIN _____602

MAKE _____604   MODEL _____606   COLOR _____608   YEAR _____610

VEHICLE TYPE ___614
 ○ CAR
 ○ TRUCK
 ○ SUV
 ○ OTHER

AVAILABILITY ___616   612
 ○ NOW
 ○ LATER

OTHER COMMENTS

___618
☐ ENCLOSED TRANSPORT

GATE PASS
 ○ NOT REQUIRED
 ○ PENDING
 ○ ATTACHED

COST
$000.00   [ ADD VEHICLE ]___620

SERVICES
FOR DEALERS
FOR TRANSPORTERS

| SHIPMENTS BILLING MANAGE TEAM SUPPORT | | | | WELCOME, JEREMY STEVENS ▾ | |
|---|---|---|---|---|---|
| REVIEW SHIPMENT | | | | | |
| PICKUP — 702 | | | DROPOFF — 710 | | |
| 432 PARK AVENUE | | | 718 7TH STREET NW | | |
| NEW YORK, NY 10022 — 704 | | | WASHINGTON, DC 20001 | | |
| INSTRUCTIONS | | | INSTRUCTIONS — 712 | | |
| MO-FR BETWEEN 9AM-5PM ONLY. | | | | | |
| CONTACT — 706 | | | | | |
| JANE DOE —— 708 | | | | | |
| 877-728-8675 | | | | | |
| VEHICLES | 716 | 718 | 720 | 722 | 724 |
| VIN — 714 | MAKE & MODEL | COMMENTS | GATE PASS | AVAILABILITY | |
| 1FAHP26W49G252740 | BMW 135i CAR, ENCLOSED TRANSPORT | LOREM IPSUM | GATE PASS (PENDING) | AVAILABILE ON AUGUST 6, 2019 | $100.00 |
| 2FTRX07W53C371582 | FORD F150 TRUCK, LONG WHEEL BASE, DUAL WHEELS | | GATE PASS (PENDING) | AVAILABILE ON AUGUST 6, 2019 | $200.00 |
| 1FTEW1EG6FKD67160 | DODGE CARAVAN CAR | | GATE PASS | AVAILABILE ON AUGUST 6, 2019 | $100.00 |
| 1GTGK24N3RE503628 | HONDA PILOT SUV | | GATE PASS | AVAILABILE ON AUGUST 6, 2019 | $200.00 |
| 4JGDA5HB8CA027037 | TOYOTA HIGHLANDER SUV | | GATE PASS | AVAILABILE ON AUGUST 6, 2019 | $150.00 |
| TOTAL | | | | | $750.00 |

[ ADD VEHICLE ] — 726

☐ I AUTHORIZE AUTOSLED TO ELECTRONICALLY DEBIT MY ACCOUNT AND, IF NECESSARY, ELECTRONICALLY CREDIT MY ACCOUNT TO CORRECT ERRONEOUS DEBITS.

728 — [ POST SHIPMENT ] [ EDIT SHIPMENT ] — 730

SERVICES
FOR DEALERS
FOR TRANSPORTERS

| SHIPMENTS | BILLING | MANAGE TEAM | SUPPORT | | WELCOME, JEREMY STEVENS ▼ |
|---|---|---|---|---|---|

SHIPMENT DETAILS: #54
DASHBOARD / SHIPMENTS / SHIPMENT DETAILS
< ALL SHIPMENTS

STATUS     ORDER SUMMARY
IN TRANSMIT

SHIPMENT CREATED     BMW 135i     1FAHP26W49G25274     UNASSIGNED     $100.00
APRIL 1, 2019
7:00AM     FORD F150     2FTRX07W53C371582     CLAIMED     $200.00

PICKUP     DODGE CARAVAN     1FTEW1EG6FKD67160     CLAIMED     $100.00
1234 STREET NAME
CITY, STATE, COUNTRY     HONDA PILOT     1GTGK24N3RE503628     CLAIMED     $200.00
MAP

INSTRUCTIONS     TOYOTA HIGHLANDER     4JGDA5HB8CA027037     COMPLETED     $150.00
12:00-3:00PM
CONTACT                                                           TOTAL $750.00
JANE DOE
877-728-8675

DROPOFF
1234 STREET NAME
CITY, STATE, COUNTRY
MAP

UNASSIGNED VEHICLES

1FAHP26W49G252740     AVAILABLE ON AUGUST 6, 2019 GATE PASS (PENDING) ADDITIONAL NOTES: [EDIT] [CANCEL]
BMW 135i                                                                            LOREM IPSUM
CAR, ENCLOSED TRANSPORT

↓ TO FIG. 9 CONT.

↑ FROM FIG. 9

LOADS

TRANSPORTER: RICHARD SMITH  ID: 3  STATUS: ON ROUTE TO PICKUP  VIEW LOCATION◎  SEE CONVERSATION >>
202-551-1233

2FTRX07W53C371582    AVAILABLE ON              (PENDING)
FORD F150            AUGUST 6, 2019 12:00PM    GATE PASS      ADDITIONAL NOTES:  [EDIT] [CANCEL]
TRUCK, LONG WHEEL BASE,                        DROPOFF BOL ▶
DUAL WHEELS                                    PICKUP BOL ▶

TRANSPORTER: AL MILLER  ID: 2  STATUS: ON ROUTE TO DROPOFF  VIEW LOCATION◎  SEE CONVERSATION >>
202-551-1233

1FTEW1EG6FKD67160    AVAILABLE ON
DODGE CARAVAN        AUGUST 6, 2019 12:00 PM   GATE PASS
CAR                                            DROPOFF BOL ▶  ADDITIONAL NOTES:  [EDIT] [CANCEL]
                                               PICKUP BOL ▶

1GTGK24N3RE503628    AVAILABLE ON              GATE PASS
HONDA PILOT          AUGUST 6, 2019 12:00 PM   DROPOFF BOL ▶  ADDITIONAL NOTES:  [EDIT] [CANCEL]
SUV                                            PICKUP BOL ▶

TRANSPORTER: CHERYL EUSTIS  ID: 1  STATUS: DELIVERED  VIEW LOCATION◎  SEE CONVERSATION >>
352-678-4567

4JGDA5HB8CA027037   AVAILABLE ON              GATE PASS
TOYOTA HIGHLANDER   AUGUST 6, 2019 12:00 PM   DROPOFF BOL ▶  ADDITIONAL NOTES:  VIEW INVOICE
SUV                                           PICKUP BOL ▶

SERVICES
FOR DEALERS
FOR TRANSPORTERS

SHIPMENTS  BILLING  MANAGE TEAM  SUPPORT                     WELCOME, JEREMY STEVENS ▾

CONVERSATION WITH: RICHARD SMITH
DASHBOARD / SHIPMENTS / SHIPMENT DETAILS / CONVERSATION

< BACK TO SHIPMENT

CONVERSATION WITH RICHARD SMITH | VEHICLES

TRANSPORTER: RICHARD SMITH          STATUS: ON ROUTE TO PICKUP          VIEW MAP ⊙
202-551-1233

DO YOU WANT BBQ?
AUGUST 5, 2019
2:15             NO I'M GOOD, WIFE PACKED ME A LUNCH
                 AUGUST 5, 2019
                 2:16

YOUR LOSS
AUGUST 5, 2019
2:17                                    I KNOW
                                 AUGUST 5, 2019
                                        2:18

☐ GATE PASS HAS BEEN ATTACHED.
  *GATE-PASS.PDF*
  [                                    ↑ ]

SERVICES
FOR DEALERS
FOR TRANSPORTERS

SHIPMENTS BILLING MANAGE TEAM SUPPORT  WELCOME, JEREMY STEVENS ▾

CONVERSATION WITH: RICHARD SMITH
DASHBOARD / SHIPMENTS / SHIPMENT DETAILS / CONVERSATION

< BACK TO SHIPMENT

| CONVERSATION WITH RICHARD SMITH | VEHICLES |

TRANSPORTER: RICHARD SMITH        STATUS: ON ROUTE TO PICKUP        VIEW MAP ⊚
202-551-1233

2FTRX07W53C371582    AVAILABLE ON                          (PENDING) ADDITIONAL NOTES: DROPOFF BOL ▸
FORD F150            AUGUST 6, 2019 12:00PM   GATE PASS                              PICKUP BOL ▸   [EDIT]
TRUCK, LONG WHEEL BASE,
DUAL WHEELS

SERVICES
FOR DEALERS
FOR TRANSPORTERS

*FIG. 12*

ADDRESS
PHONE
WEBSITE

INVOICE FOR:                FROM:                                    INVOICE: #43
DEALERSHIP NAME             CHERYL EUSTIS                            ISSUE DATE: AUGUST 30, 2019
83 OAK AVE.                 246 WINDFALL DRIVE                       DUE DATE: SEPTEMBER 30, 2019
STOCKBRIDGE, GA 30281       TEMPLE HILLS, MD 20748
                            352-678-4567

VEHICLE                                                              PRICE

4JGDA5HB8CA027037                                                    $150.00
TOYOTA HIGHLANDER

TOTAL:           $150.00

AMOUNT PAID:     $150.00
                                                    VIA AMEX *1234

DUE:             $0.00

SHIPMENTS

- 180 10TH AVE  $400
  NEW YORK, NY 10011  2 VEHICLES >
  1600 PENNSYLVANIA AVENUE,  225 MILES
  WASHINGTON, DC 20050
- 580 NEWPORT ST.  $500
  HAMBURG, NY 14075  3 VEHICLES >
  39 E. CYPRESS COURT  369 MILES
  AMITYVILLE, NY 11701
- 59 OLD KENT DRIVE  $650
  TRUMBULL, CT 06611  4 VEHICLES >
  762 ROOSEVELT STREET  54 MILES
  FORT LEE, NJ 07024
- 75 W. ST PAUL ST.  $250
  SEWELL, NJ 08080  2 VEHICLES >
  8870 LOOKOUT ST.  170 MILES
  RESTON, VA 20191

SHIPMENTS — 1602    LOADS — 1604    PROFILE

< SHIPMENTS    SHIPMENT

PICKUP LOCATION  180 10TH AVE
                 NEW YORK, NY 10011

DROPOFF LOCATION 1600 PENNSYLVANIA AVENUE,
                 WASHINGTON, DC 20050

[map: NEW YORK, $4HR 25MIN, WASHINGTON, $4HR 16MIN]

VEHICLES

⊘  FORD F350
   DUAL-REAR WHEEL
   AVAILABLE: AUGUST 6, 2019

⊘  TESLA MODEL S
   ENCLOSED TRANSPORT
   AVAILABLE: NOW
   GATE PASS: PENDING

TOTAL:                          $400

[ ACCEPT LOAD ] — 1702

SHIPMENTS — 1602    LOADS — 1604    PROFILE

METHOD AND SYSTEM FOR AUTOMATED VEHICLE TRANSPORTATION

RELATED APPLICATION

This application claims priority to U.S. Non-Provisional application Ser. No. 16/664,353, entitled "Method and System for Automated Vehicle Transportation," filed Oct. 25, 2019, which in turn claims priority to U.S. Provisional Application No. 62/751,228, entitled "Method and System for New Car Exchange and Automated Vehicle Transportation," filed Oct. 26, 2018, both of which are incorporated by reference herein.

FIELD OF THE INVENTION

The present invention generally relates to an automated vehicle transportation system, and more particularly to a system for users, such as car dealerships, to ship vehicles automatically with auto transporters using computer and/or mobile communication devices.

BACKGROUND

It is estimated that over 40 million vehicles are shipped in the United States each year. Car dealerships are responsible for the vast majority of the shipping of those vehicles. However, conventional shipping of a car is a tedious manual process that involves calling a broker, who then calls auto transport truckers to see if they will pick up the car. If a trucker accepts, typically, neither the customer nor the broker knows where the trucker is before or after the car is picked up for shipment. The process also typically involves a customer, such as a dealership, receiving and needing to sign time consuming paperwork. The transporter also typically has to deal with paperwork and manual invoicing. Furthermore, the broker often takes a large commission, but the amount is unknown to the customer and often the trucker too. The process is highly inefficient and there are often many errors, late deliveries, late pick ups and long time delays. While this is a problem for most people shipping cars, this is a particular problem for car dealerships that ship many cars.

Such car dealers need to routinely transport the vehicles to and from auctions or end consumers, or from one dealer location to another. Conventionally, the dealers engage with plurality of transport providers and get various price quotes manually. Finding the correct and most appropriate transporter for shipment of the vehicles of the dealer/end consumer can be a major challenge. Additionally, even after a transporter is located, the communication with the transporters is done manually and conventional systems do not provide any tracking abilities for the customer or car dealer to check the current real-time location or status of the vehicle shipment. To add to the problems, conventional technologies use manual billing and staff-intensive accounting procedures costing a significant amount of time and money whereas accounting and reconciliation of expenses falls primarily on the dealer.

Furthermore, there can be damage to vehicles that may not be properly or efficiently recorded with the typical manual process and as a result, it can be difficult to tell who caused the damage and thus who is responsible. Also, the haggling or negotiating over various price quotes can be large a waste of time for the dealers, brokers and truckers.

Conventional processes for transporters are also complex, costly, and time-consuming. The largely manual nature of searching creates significant productivity losses for drivers and other transportation company personnel. Conventionally the transporter has to waste hours manually finding and accepting loads. As the process is typically manual which often results in inefficiency, the transporters routinely lose money driving with unutilized space on their trucks or "deadheading," driving on a return trip with an empty truck after a delivery. Also, while transporters are in route with their loads, there is no conventional easy way for them to access a service in order to easily discover additional vehicles that are available for pickup. And transporters, like dealers, must employ varying and inconsistent communication methods, including telephone, fax, mail and email to keep in touch with brokers, dealers or other customers.

Furthermore, the transporters send manual invoices and receive manual payment typically weeks or months after shipment is complete, or sometimes payment is not received at all. Also, with significant brokers' fees, transporters lose significant income taking less pay than they could otherwise. If damage to a car that is picked up is not properly recorded with the typical manual process, the transporter could incur liability for a car that was already damaged before pick up, or damaged after drop off. Each transaction generates significant paperwork and administrative tasks, which slows down transporters.

The dealers have several conventional options: first, dealers can handle the transportation themselves, either by sending staff to retrieve the vehicle and possibly experiencing a concomitant increase in liability and risk, or taking the time to list the vehicle on an automobile transport marketplace and spending the time dealing with transporters to negotiate the fees and time frame of pickup and delivery. Second, dealers can use a transport broker which may save some time, but is a very manual process and has an unknown associated cost. Third, dealers can work directly with a transportation company that gives a bid and timeframe for the dealer, but likewise has an unknown associated cost. In any situation, the dealer does not know where the shipped car is, or where the transporter's truck is. These options cost the customer or dealer money and time.

Conventionally, Cox Automotive's Central Dispatch service is a major venue for transportation companies or individual transporters to obtain information regarding new and used vehicles (loads) for transport. However, this service is merely a posting board, and requires significant manual interaction and phone calls to ship a car. This conventional system requires transporters to: (1) search online for new and used vehicles that are available for transport; then (2) make manual contact (mail, telephone, fax, email) with clients seeking vehicles transported; (3) generate and collect paperwork by hand, or through a secondary system, on pickup and delivery; (4) make manual contact (mail, telephone, fax, email) with the pickup dealers, delivery dealers, brokers, and others to give updates on the driver's status and/or location; and (5) handle paperwork and payment. Transporters also often receive limited specifics on the vehicles they will be transporting or on the availability of loads to fill open spaces on their individual trucks and trailers. It is also difficult for transporters to efficiently determine the available cars along their route to and from a delivery to ensure their truck stays full to realize the most amount of money for the trip. These services also often have hefty subscription fees.

Other services, such as Ready Logistics, have similar drawbacks and still require manual communication and do not show the customer the location of the vehicles in transit.

As such, it is desirable to solve these and other related problems.

SUMMARY

In accordance with methods and systems consistent with the present disclosure, a method in a data processing system for automated vehicle transportation is provided comprising receiving, from a customer, vehicle information of a vehicle to be shipped, to be accepted on a computing device by an automotive transport trucker to transport the vehicle. The method further comprises automatically transmitting the vehicle information to the computing device of the automotive transporter trucker for acceptance for transport by the automotive transport trucker, and receiving an indication of acceptance to transport the vehicle by the automotive transport trucker on the mobile device.

In another implementation, a data processing system for automated vehicle transportation is provided comprising a memory configured to store instructions to cause a processor to receive, from a customer, vehicle information of a vehicle to be shipped, to be accepted on a computing device by an automotive transport trucker to transport the vehicle. The instructions further cause the processor to automatically transmit the vehicle information to the computing device of the automotive transporter trucker for acceptance for transport by the automotive transport trucker, and receive an indication of acceptance to transport the vehicle by the automotive transport trucker on the mobile device. The processor is further configured to execute the instructions.

BRIEF DESCRIPTION OF THE DRAWINGS

FIG. 5 illustrates an exemplary new shipment entry page.

FIG. 6 illustrates an exemplary page showing the addition of a vehicle while creating the new shipment.

FIG. 7 illustrates a review shipment screen, another exemplary user interface of the automated vehicle shipment system.

FIG. 9 illustrates an exemplary shipment details page.

FIG. 11 illustrates an exemplary user interface used by the user for access to the conversations between the user and the transporter.

FIG. 12 shows the user the vehicles of the transporter the user is conversing with.

FIG. 13 illustrates an exemplary invoice shown to a user on the screen, in one implementation, upon completion of a delivery.

FIG. 16 shows an exemplary user interface of a mobile app on a transporter device 104 for a transporter to view available shipments.

FIG. 17 illustrates an exemplary shipment details page of the mobile application

Figure 1:
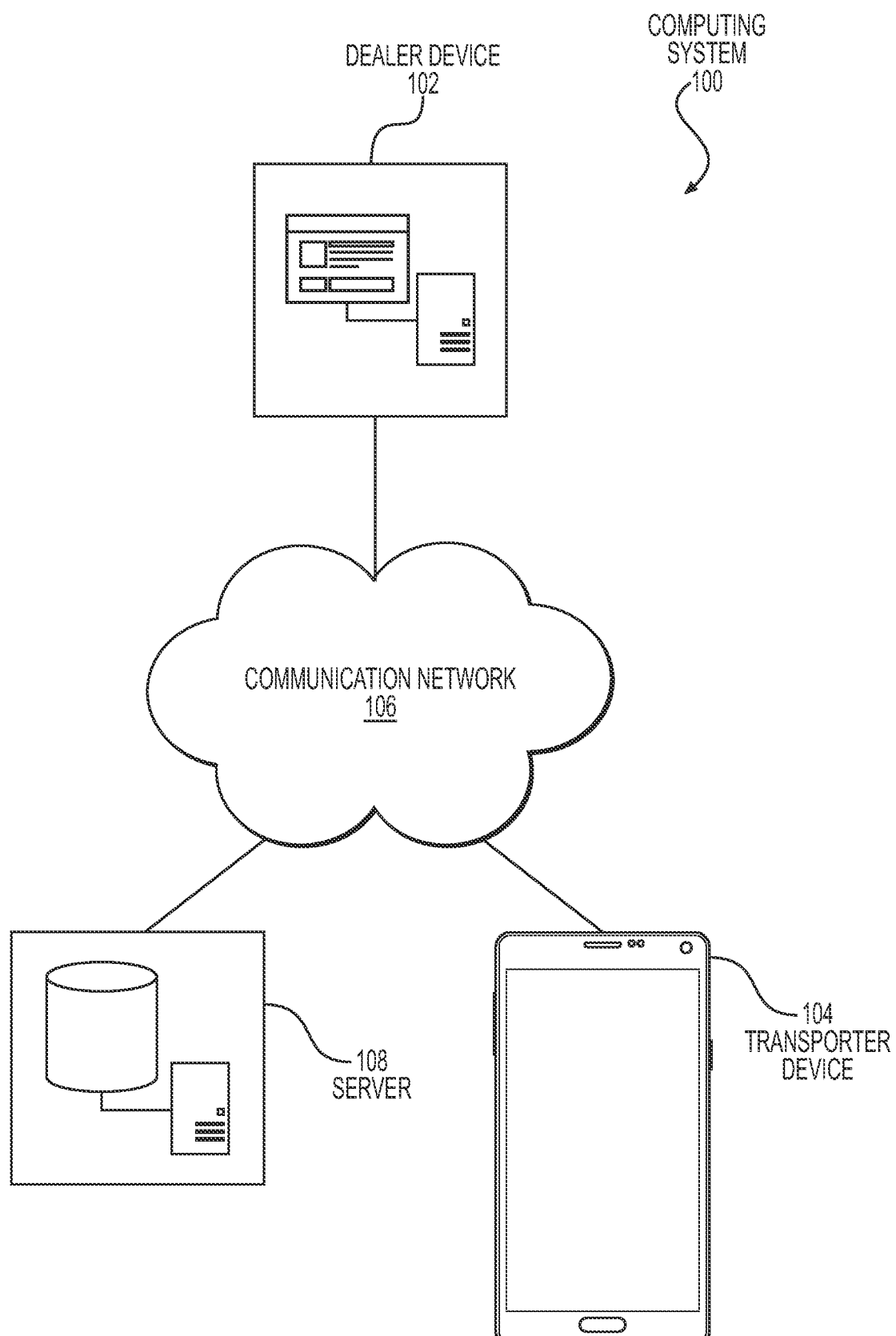
FIG. 1 is a diagram that illustrates a computing system 100 in which various embodiments of the method and the system may be implemented.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

Methods and systems in accordance with the present disclosure allow a car shipper or car dealer to ship a car automatically from a computer or mobile computing device such as a smart phone, and have the car accepted directly electronically by a transporter on a smartphone to pick up and deliver. They permit a user to ship a vehicle, such as a car, by entering the vehicle on a website and submitting with a click of a button or on a mobile application on a smart phone, for example, and the automobile transporter to automatically select the car for pick up by tapping on a mobile application on a mobile computing device such as a smart phone. The transaction is handled automatically by the system, and manual communication such as phone calls and faxes and paperwork are not required. The system also tracks the location of the vehicle via the transporter's smartphone and displays the real-time location to the user or customer. The payment may be collected electronically from the user, and automatically paid to the transporter electronically.

Users may efficiently ship vehicles with the click of a button, and transporters can easily find and accept vehicles with the tap of the app. The ease of accepting the vehicles for pick up and delivery and ability to view where the vehicles are, allows the transporter to tap on the vehicles they need to pick up to reduce empty space on the truck, and thereby increase income.

Transporters also realize quick or immediate electronic pay, eliminating the need to submit manual invoices and wait weeks or months for payment, and also eliminate the risk of not getting paid.

The system may eliminate the typical large broker fee of a human broker using manual communication, thereby allowing users and customers to pay less, and transport truckers to earn more.

The system also provides a video bill of lading ("BOL") that provides a fast, simple, and user-friendly solution for documenting vehicle condition, pick-up, and delivery information. The system prompts the transporter through the app to take a video of the car, pointing out any damage before pick up, so that the transporter is not responsible for it. The system may also have the transporter take another video upon delivery so that both the transporter and the customer or user have a record of the condition of the car at pick up and drop off if any damage was caused.

Tracking of the mobile application of the smart phone of the trucker reduces the need for telephone and other communication, while providing delivery route and status information to the shipping customer.

The system empowers users such as dealers and transporters to ship cars more efficiently, often without communication required, and more directly, continuously, and automatically than convention systems. The methods and systems help dealers and transporters to see potential opportunities for ease of use, transparency, increased revenue, and reduction of time.

Dealers and other users can improve overall ease, eliminate calls for transportation, thereby saving time, reduce broker fees, reduce expenses, eliminate liability and logistical issues, smooth year-end accounting processing. In addition, transporters can greatly increase ease, gain more vehicles for transport, eliminate paperwork, reduce liability with an automatic video BOL, and enjoy faster easier electronic payment and higher profitability.

The user may be a car dealer, for example, but may also be anyone else who ships a car. The user may be a customer who wishes to ship a car and who will pay for the shipping. The system connects the user, customer or dealer directly with the auto transport trucker, without a broker or intermediary in between.

FIG. 1 is a diagram that illustrates a computing system 100 in which various embodiments of the method and the system may be implemented. The computing system 100 may include a dealer device 102, a transporter device 104, a server 108, and a communication network 106. In an embodiment, the dealer device 102, and the transporter device 104 may communicate with the server 108 via the communication network 106, such as the Internet. Although only one dealer device 102 and one transporter device 104 are shown, many more devices may be used with the computing system 100, whereas there may be many users on the system (both users shipping vehicles and transporters transporting the vehicles.) Although dealer device 102 is called a dealer device, it may be used by any user who wishes to ship a car.

In an embodiment, the server 108 may refer to a computing device, such as a computer or server, that includes a memory for storing a program for implementing methods and systems consistent with the present disclosure, and a program that executes the program in the server 108. The dealer device 102 and transporter device 104 may interact with the server 108 to execute the procedures disclosed. Server 108 may not necessarily functionally operate as a separate entity, whereas in an embodiment, the functionalities of the server 108 can be integrated into the dealer device 102 and/or the transporter device 104.

In one implementation, server 108 may operate as a web server on the communication network 106 such as the Internet. Dealer device 102 and transporter device 104 may also represent other computers on the Internet, such as users' computers having web browsers. Dealer device 102 and transporter device 104 may have include web browsers and/or mobile apps and may be used by users to access the Internet or other network and access server 108. There may be any number of user computers and any number of server computers. Users of the dealer devices 102 and transporter devices 104, for example, may be customers looking to ship cars, car dealers, or auto transport truckers, for example, on the automated transport system by accessing the server 108.

Figure 2:
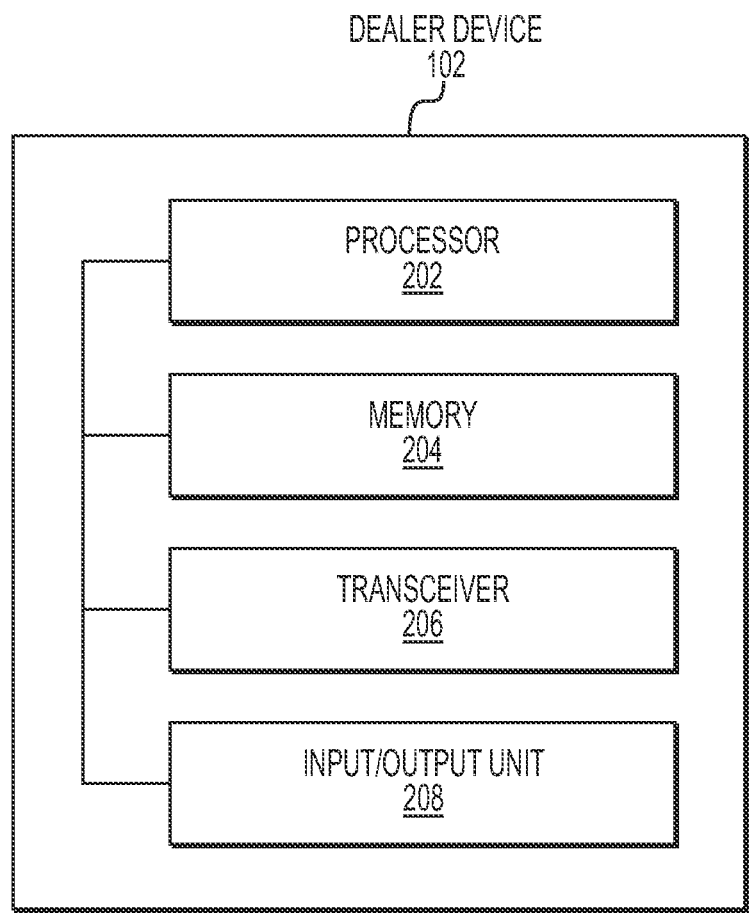
FIG. 2 depicts a dealer device 102 used by a user, customer or car dealer for shipping a car.

FIG. 2 depicts a dealer device 102 used by a user, customer or car dealer for shipping a vehicle. The dealer device 102 may refer to a computing device used by a user, such as a car dealer who intends to procure or sell vehicles or person who wants to ship a vehicle. The dealer device may be a computer and may comprise of one or more processors and one or more memories. The one or more memories may include computer readable code that may be executable by the one or more processors to perform predetermined operations. It should be noted that the vehicle shipped may be any type of vehicle, including cars, sport utility vehicles (SUV's), vans, trucks or any other suitable vehicle.

The dealer device 102 may be a computer that further comprises a processor 202, a memory 204, a transceiver 206, an input/output unit 208. The dealer device 102 may also be a mobile computing device, such as a smart phone, or a tablet computing device, such as an iPad. The memory 204 stores a program for implementing methods and systems consistent with the present disclosure, which is executable by the processor 202.

Figure 3:
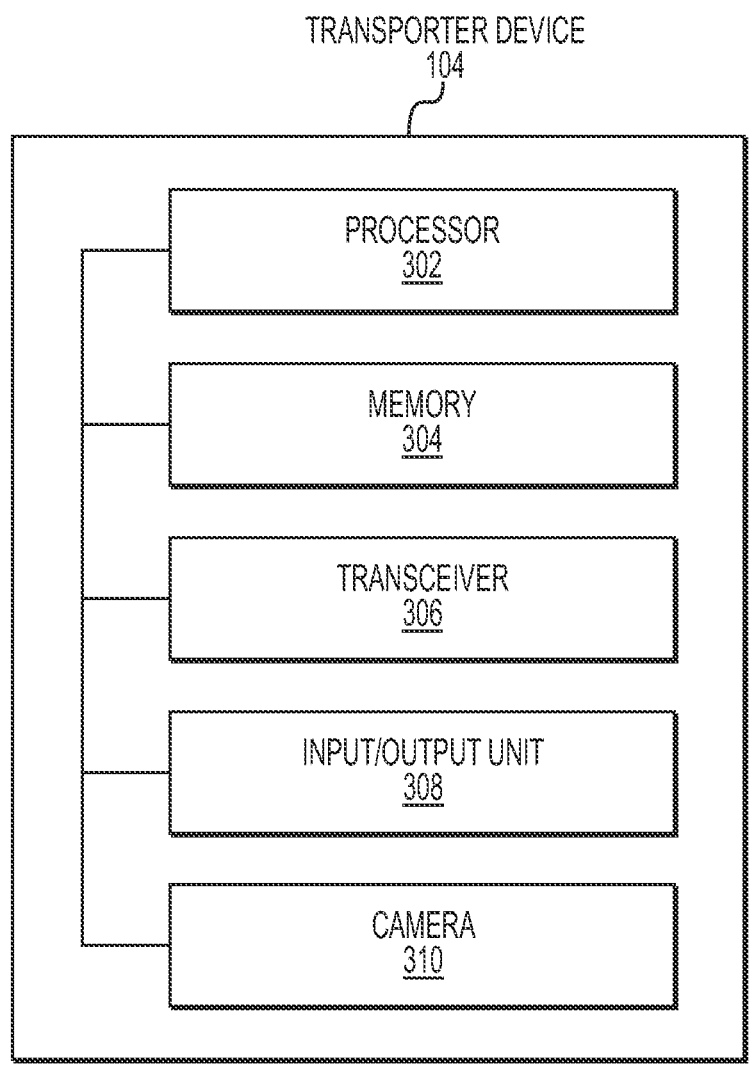
FIG. 3 depicts a transporter device 104 used an automotive transport trucker for to accept vehicles for transport.

FIG. 3 depicts a transporter device 104 used an automotive transport trucker for to accept vehicles for transport. The transporter device 104 may refer to a computing device used by a user, such as a transporter. The transporter device 104 may comprise processor 302, a memory 304, a transceiver 306, an input/output unit 308 and camera 310. The memory 304 stores a program for implementing methods and systems consistent with the present disclosure, which is executable by the processor 302. In some implementations, the transporter device 104 is a mobile smartphone.

Either the dealer device 102 or the transporter device 104 may be a desktop computer, a laptop, tablet computer, a smartphone, or the like. These devices are capable of accessing (or being accessed over) a network (e.g., using wired or wireless communication capabilities). These devices are used by users, customers and transporters to access the system and website or mobile application. To ship a car, the customer goes to the website or mobile application to access the shipments page.

Figure 4:
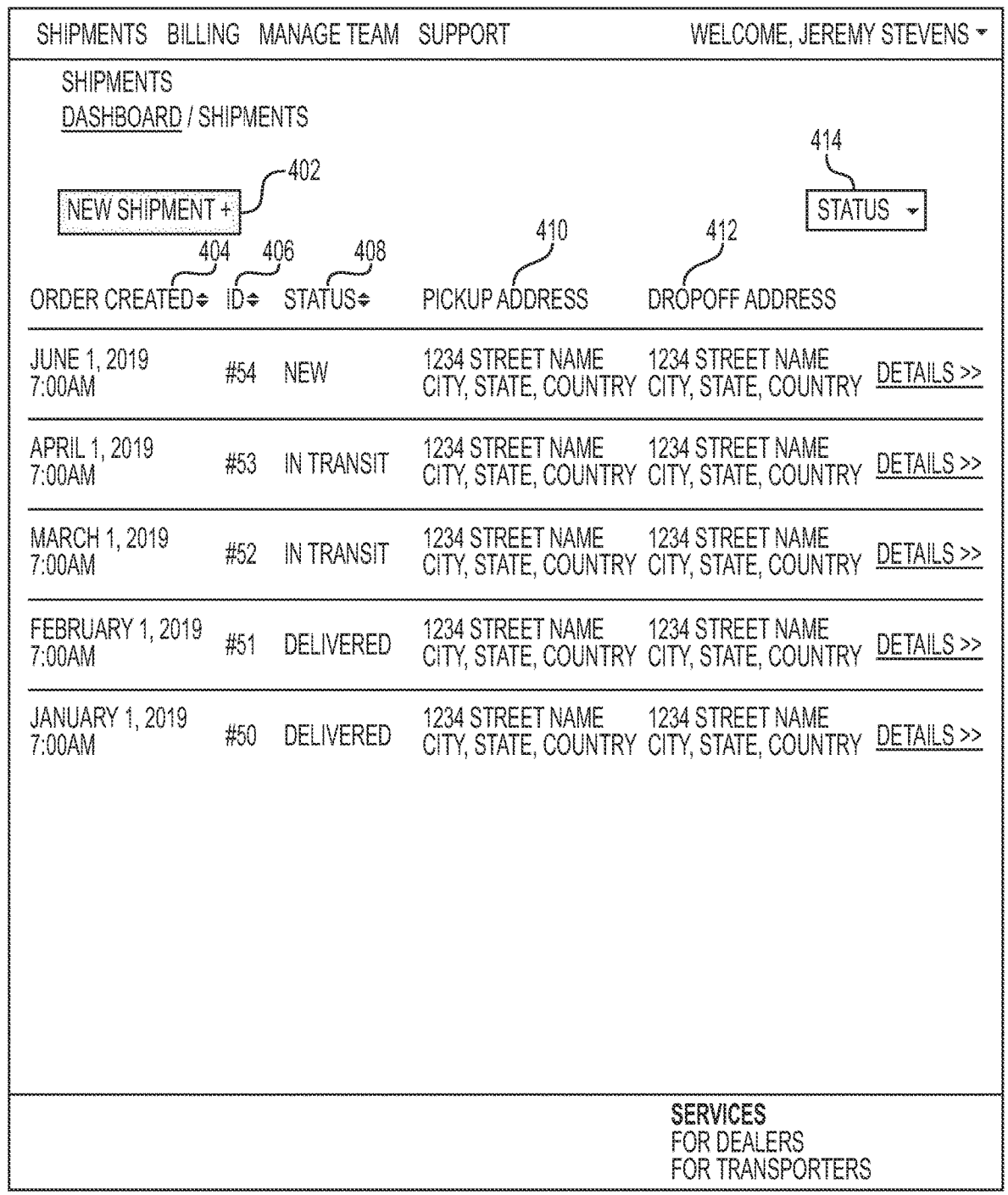
FIG. 4 illustrates a shipments page for a user or dealer.

FIG. 4 illustrates a shipments page for a user or dealer, which is an exemplary user interface of the automated vehicle shipment system, that shows that the user can view current shipments in progress or delivered shipments. It also shows that the user can ship a vehicle automatically by creating a new shipment by clicking the "new shipment" button 402. In this exemplary page, the user can see details for each shipment including the date the order was created 404, the identification (ID) number 406, the status 408, the pickup (or origin) address 410, the drop off (or destination) address 412, and any other details by clicking on details, which will take the user to a details page described below. The user can also filter by the status button 614. Clicking the new shipment button 402 bring up the shipment entry page shown in FIG. 5.

FIG. 5 illustrates a new shipment entry page, which is an exemplary user interface of the automated vehicle shipment system that shows details of the new shipment creation by the user. After the dealer has clicked "new shipment" on FIG. 4, the new shipment page is displayed on the dealer device 102. This is where the user enters the address 502, contact name 504, phone number 506, and any pickup instructions 508 for the new shipment. Below that, the drop off information may be entered with the same fields of the full address 510, the contact name 512, phone number 514, and the drop off instructions 516. Next, the vehicles are added with the details by clicking on add vehicle button 518.

Once that has been completed, the dealer clicks Review Shipment button 710 to review the details.

In one implementation, when entering the address, the system will offer the user to use the user's current location as automatically determined by the system. The system may also default to automatically fill in the dealer's address for either the pick up or drop off address. The system may also allow the user to save commonly used addresses to avoid the time of re-entry of pick up or drop off addresses.

Also, although shown as a website with a dealer on a computer, the system may provide a user or a dealer a mobile application to enter the vehicle information and post the shipment for acceptance by transporters. In this case, the mobile application may have a VIN number scanner to automatically scan a VIN number on a vehicle for entry.

FIG. 6 illustrates an exemplary page showing the addition of a vehicle while creating the new shipment. The user may enter on the dealer device 102 the information for the vehicles for pickup, including the Vehicle Identification Number (VIN) 602, the make 604, model 606, color 608, year 610, additional comments 612 about the car, and upload a gate pass or give the status of the gate pass (not required or pending). A gate pass is a document of information typically used at car auctions for auto transport truckers to be able to access the car when picking up. Some of the fields, such as year of the vehicle, may be optional. In one implementation, the system automatically determines the make, model and/or year of the car from the VIN, and automatically fills those fields in. This may be done by accessing an outside service or web server. Next, the vehicle type 614 is entered, which may be either a car, truck, SUV, or other. This button may default to a car, or whatever is the most likely used by the user. The user may also select whether the availability 616 of the car is now or later, and if later, may specify the date of availability. The dealer then has the opportunity to select an enclosed transport box if the user wishes the vehicle to be shipped in an enclosed transport. The cost may be displayed here too. The dealer will then click "Add Vehicle" 620 to add that vehicle to the shipment.

In one implementation, the server 108 may determine the cost by the price per mile of the distance of the delivery. In another implementation, this is determined by a different price per mile for different ranges of distances. For example, 0-50 miles is a first price per mile, while 51-100 miles is a second price per mile, 101-150 miles is a third price per mile amount. The total amount is the sum of the prices per mile of the various ranges totaled up. If a car is shipped 120 miles, the price would be the total of 50 times the first price per mile, plus 50 times the second price per mile plus 20 times the third price per mile.

In another embodiment, the pricing process may factor in any other factor such as route distance, route duration, route fees, fuel costs, weather conditions, road conditions, highway tolls, truck availability, and/or number of available drivers. Any other suitable factor may also be used. The pricing process may also charge more for enclosed transports.

In one implementation, the system provides an error notification if the user attempts to enter a VIN of a vehicle that's already been posted for acceptance. In another implementation, multiple VIN's may be entered at once, for example, in a larger text field, and the system can accept them all at once.

In another implementation, the dealer could forward an email having VIN numbers and/or gate passes to an email address of the server 108, and the server 108 may parse the VIN's and/or gate passes for automatic entry for acceptance by transporters.

FIG. 7 illustrates a review shipment screen, another exemplary user interface of the automated vehicle shipment system. On the review shipment screen, the dealer sees the pickup details including the address of the pickup 702, the instructions for the pickup 704 (which may include hours of the pickup, for example) and the contact name 706 and phone number 708. The drop-off address 710 is listed with any instructions 712. The drop off may also have a contact name and number too (not shown). Below that section, the vehicles are listed by VIN 714, make and model 716, comments 718, gate pass details 720, availability 722, and the cost 724. The dealer can then add more vehicles to the order from that screen by clicking add vehicle 726 or they can choose to post the shipment by clicking post shipment 728. In one implementation, posting the shipment occurs after agreeing to terms and conditions. If the order needs to be changed in any way, they can click the edit shipment button 730 to do so.

Figure 8:
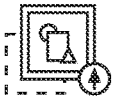
FIG. 8 illustrates a shipment editing screen.

FIG. 8 illustrates a shipment editing screen, in accordance with some embodiments of the present disclosure. On the editing screen, the user can edit the VIN 602, make 604, model 606, color 608, whether it is an enclosed transport 618, the vehicle type 614, and any other comments 612. They can also edit the availability 616 and the date that it is available if it is not now. The gate pass can then be selected with the detail of not required, pending, or attached. The user can then easily attach a gate pass to that screen by drag and drop to upload or by clicking on a button titled "Add Gate Pass" which will allow them to upload a file from a specific location. In one implementation, gate passes must be .pdf, .png, or .jpeg format, however other file types may be suitable in other implementations. The dealer can then add another vehicle 620 from that screen, or review this one and finish the current addition.

FIG. 9 illustrates an exemplary shipment details page. This page may be accessed, for example, by clicking a shipment on the shipment list page shown in FIG. 4. By clicking into an existing shipment, the dealer can see specific details for that shipment which includes the status, date the shipment was created, the pickup address with a link to a map, the specific pickup instructions, and the contacts for the shipment.

The same details can be shown for the drop-off details. The order summary, located in the middle of the screen, showcases each vehicle by make and model, the VIN for each vehicle, if it is unassigned or claimed, and the cost for each vehicle. The total for the dollar amount of the shipment is listed at the end of the individual vehicles listed. Any unassigned vehicles as shown in FIG. 9 may be organized by headings and detailed with the VIN, make and model, type of vehicle, if it is enclosed transport or not, when the car is available, gate pass status, and any additional notes. The dealer can edit that entry or cancel it. Under the loads section as shown in FIG. 9, the dealer can see which trucker is assigned to each load (group of cars on a truck), what their status is, where they are located using a map, and any conversations they have had through the mobile-based app, for example. The transporter's name and phone number is easily shown to obtain quick access to the trucker on a specific load. For those en route to drop-off, the dealer can see the gate pass details with the drop-off video bill of lading (BOL) and the pickup video BOL in addition to the above details. A user may also view the invoice for a completed shipment, for example. On the shipment details screen, if the dealer wants to cancel a specific vehicle, they may click the cancel button. When a vehicle has been canceled, the additional notes will indicate when it was canceled with a date and time stamp and who canceled the order.

Figure 10:
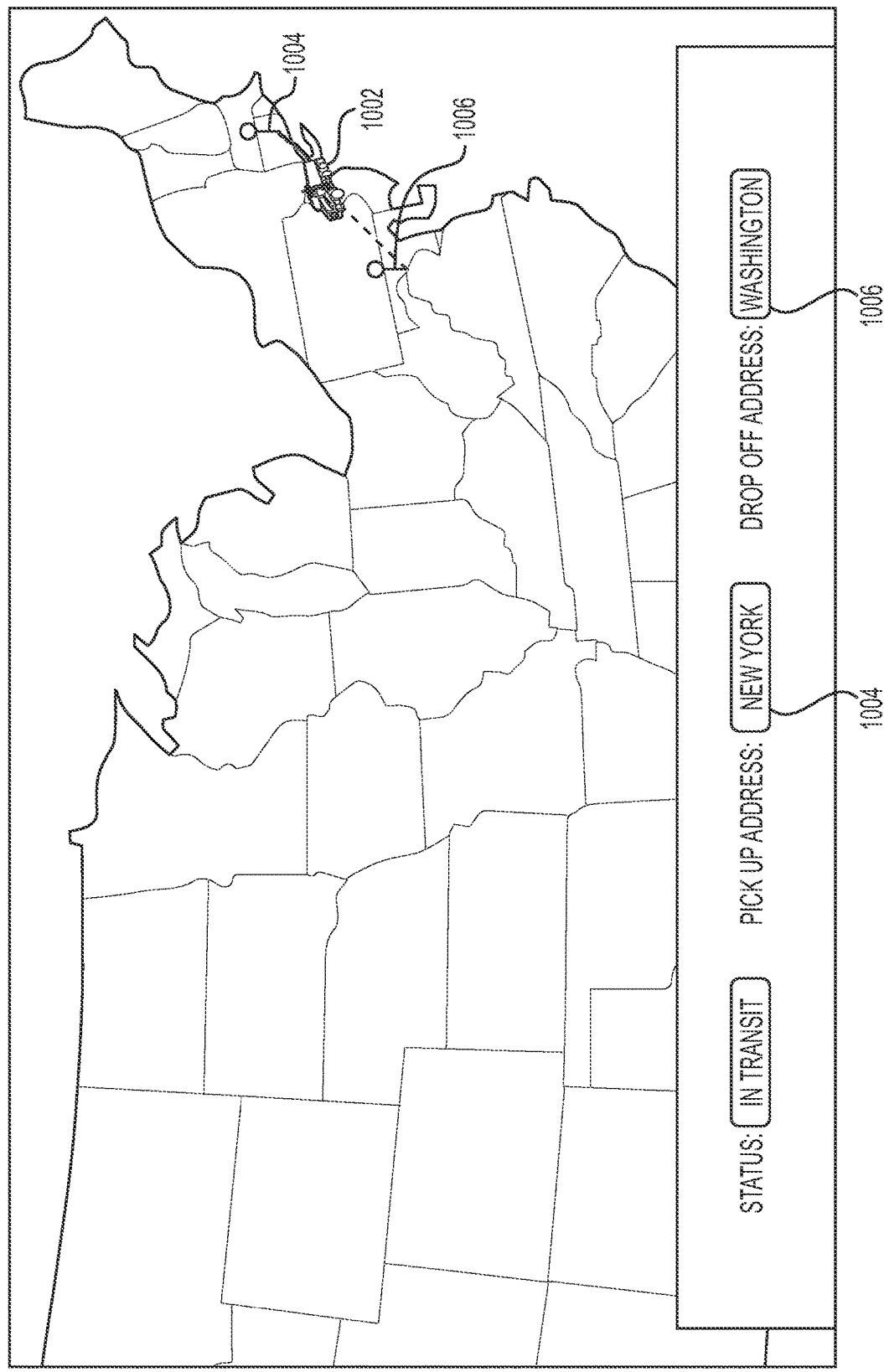
FIG. 10 shows the user's view of the transporter's location.

FIG. 10 shows the user's view of the transporter's location. This view may be brought up, for example, when the user clicks on the "view location" button on the shipment details screen shown in FIG. 9. As shown, this screen displays the transporter's location 1002, the pick up location 1004 and drop off location 1006. It may also show a status of whether the transporter is on the way to pick up the vehicle, is in transit with the vehicle, or has dropped it off, for example. It may show the distance from the transporter to the drop off, or the time estimate until delivery (not shown). Other suitable information or statuses may be used. In one implementation, the transporters real-time location is displayed using the GPS on the transporter's smartphone via the mobile app.

FIG. 11 illustrates an exemplary user interface used by the user for access to the conversations between the user and the transporter, in accordance with some embodiments of the present disclosure. This section acts as a chat functionality allowing real-time text conversation to occur between the user and the transporter. When the dealer wants to communicate with or gain access to the conversations that have occurred with a specific trucker, they may click on conversation within their shipment and load details as shown in FIG. 9. There, the dealer can see the trucker's name, phone number, status of their load, where they are on a map, and any conversations that have occurred with a date and time stamp of each message sent and received as shown in FIG. 9. This area may also display any events in such as, when the gate pass was attached as shown in FIG. 9. They can type to text communication with the transporter. However, this may typically be unnecessary, whereas the system is designed to allow the cars to be shipped without communication between the customer and the trucker.

FIG. 12 shows the user the vehicles of the transporter the user is conversing with. By clicking into vehicle section of the conversation module, the dealer can see details for the vehicle that is attached to that driver and gate pass, if the gate pass is pending or not, and additional notes on the specific vehicle as shown in FIG. 12.

FIG. 13 illustrates an exemplary invoice shown to a user on the screen, in one implementation, upon completion of a delivery. As shown in FIG. 9, under loads that are have been completed, the dealer has the opportunity to select "view invoice." As shown in FIG. 14, the invoice number appears with the issue date and due date clearly indicated. The invoice shows who it is for, who it is from, and what vehicles are tied to that invoice. The price of each vehicle is detailed with a total at the bottom for the vehicles. The invoice is indicated as paid and shares the amount that was paid, which type of card or other payment method is used, and the last four digits of the account used for payment.

In one implementation, a user can pay with any acceptable form of payment such as credit card, debit card, bank account, or more efficient electronic payment forms and mobile wallets, such as Apple Pay or Samsung Pay.

Figure 14B:
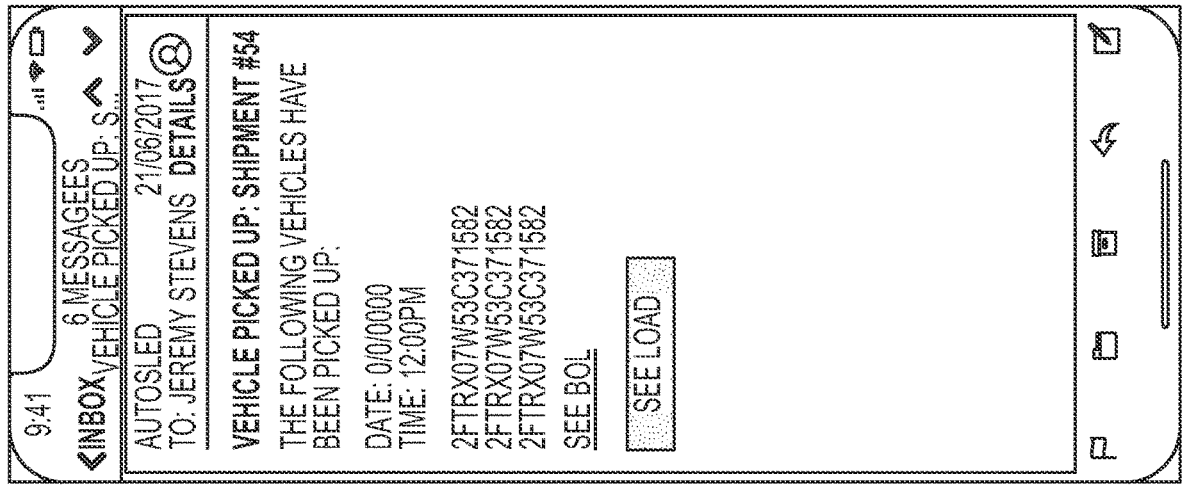
FIG. 14B shows the email that a user receives when the transporter picks up an accepted vehicle
Figure 14A:
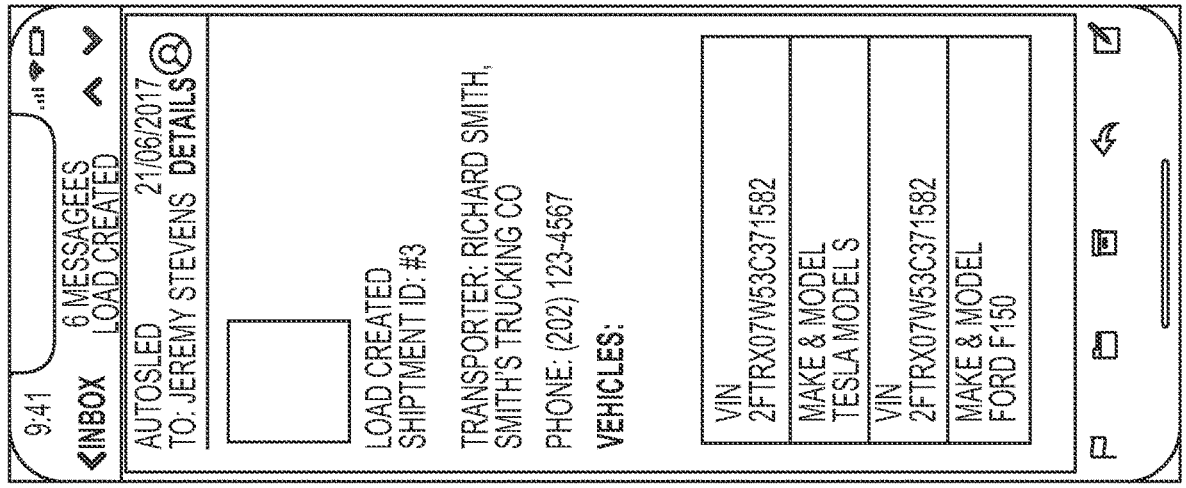
FIG. 14A shows the email sent to the user when the transporter accepts vehicles posted by the user.

FIGS. 14A-14D illustrates exemplary email messages, in accordance with some embodiments of the present disclosure. FIG. 14A shows the email sent to the user when the transporter accepts vehicles posted by the user. The user is able to see that a load was created, the shipment ID number, the transporter's name, the trucking company they represent, their contact phone number, and which vehicles are in that load. The vehicles are detailed by VIN number as well as the make and model of each vehicle. The year may also be included (not shown).

FIG. 14B shows the email that a user receives when the transporter picks up an accepted vehicle. It shows the details of the pickup for a particular shipment, including the date and time that specific vehicles were picked up, the VIN for each, and a link to the BOL. There is a link that provides an option to see the load details with a button below the VIN numbers.

Figure 14D:
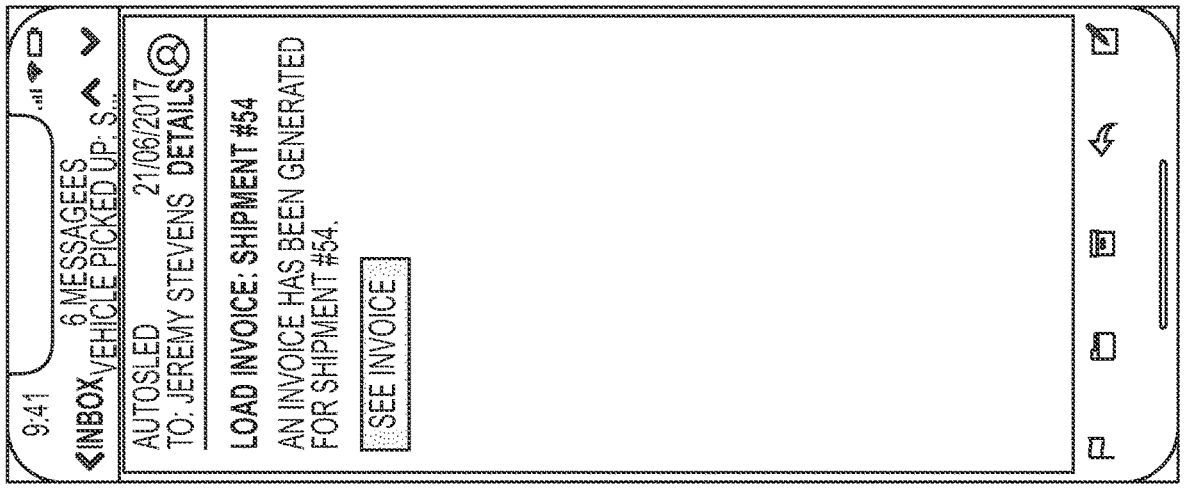
FIG. 14D shows the invoice email the user receives after a shipment is completed.
Figure 14C:
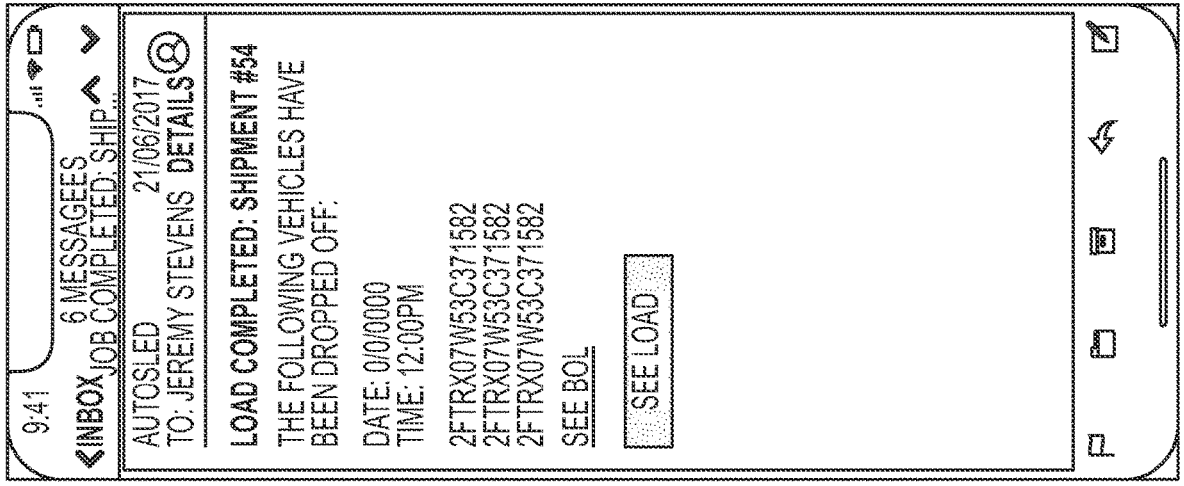
FIG. 14C shows an email sent to the user when the vehicles are dropped off.

FIG. 14C shows an email sent to the user when the vehicles are dropped off. For any loads that are complete, this screen shares the date and time the order was completed, the VIN numbers for each vehicle in that load, an opportunity to see the video BOL and a button to see the load.

FIG. 14D shows the invoice email the user receives after a shipment is completed. When loading a specific invoice within the app, the dealer can see when a specific invoice has been generated for a shipment and they can see the invoice by clicking a button.

Figure 15:
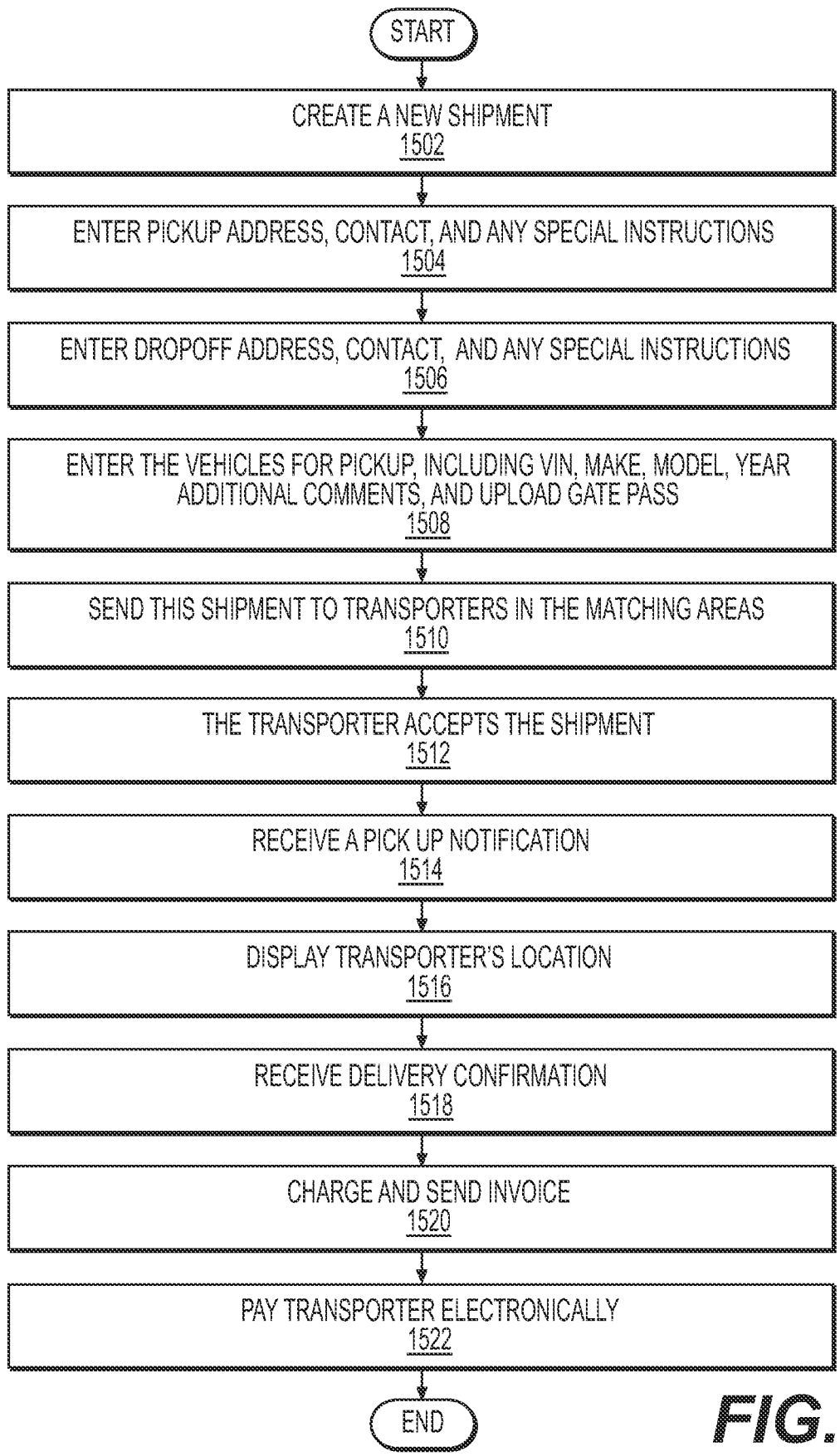
FIG. 15 is a flowchart illustrating a method for shipping a vehicle automated vehicle transportation performed by the user or dealer device 102 and server 108.

FIG. 15 is a flowchart illustrating a method for shipping a vehicle automated vehicle transportation performed by the user or dealer device 102 and server 108. First, the user may click "new shipment" 909 to create a new shipment (step 1502). To do so, the user may enter the pickup address 502, pick up contact name 506 and number 508, and any comments or special instructions 510 as shown on FIG. 5 (step 1504). The user using the dealer device 102 enters the drop-off address 510, contact name 512, phone number 514 and any comments 515 (step 1506). Then the user can click "add vehicle" 518 to add a vehicle. The user may enter on the dealer device the information for the vehicles for pickup, including the VIN 602, the make 604, model 606, color 608, year 610, additional comments about the car, and upload a gate pass or give the status of the gate pass (not required or pending) (step 1508). A gate pass is a document of information typically used at car auctions for auto transport truckers to be able to access the car when picking up. Also, the year of the car may optionally be entered (not shown).

The server 108 may then send the shipment information to transporters to accept on their mobile apps (step 1510). In one implementation, the shipments are sent to transporters in the areas matching predefined criteria. Then a transporter accepts the shipment on the mobile app on the transporter device 104 (step 1512) shown below with respect to FIG. 18, and the user receives a confirmation of acceptance by the transporter.

The transporter picks up the vehicle and creates a video BOL (described below), and the user receives a notification that the vehicle has been picked up (step 1514). The transporter drives to deliver the vehicle(s), and the server 108 may display the transporter's location to the user (step 1516). When the transporter delivers the vehicle(s), the server 108 may send to the user a delivery confirmation (step 1518). Upon a successful delivery, the system may charge the user electronically and sends an invoice to the user (step 1520). Alternatively, the user may be charged when the vehicle is first entered for acceptance by a transporter. The system then pays the transporter electronically (step 1522). In one implementation, this payment is subject to an administrator's approval.

FIG. 16 shows an exemplary user interface of a mobile app on a transporter device 104 for a transporter to view available shipments. The available shipments screen shows the available shipments. In one embodiment, for each shipment, the page may show the pickup address, the drop off address, the number of vehicles in the shipment, the transporter's payout amount and the distance between the drop off address and the pick up address. Other suitable information may also be displayed. The transporter's payout amount may also be determined by price per mile, or similarly to the dealer's price determination. In one implementation, the page is accessed by pressing the shipments button 1602 on the app. The available shipments page may also show a loads button 1604 which takes the transporter to the page which shows their loads in progress or completed (discussed below with respect to FIGS. 18A-18B). The user may also access their profile from this page. When the transporter taps on an available shipment, the mobile app displays a page displaying detailed information on the shipment, as shown in FIG. 17. In one implementation, the available shipments may be sorted by distance from the transporter's current location, so that closest vehicles for pick up appear first in the list. Other suitable sortings are possible, such as sorting by payout amount, number of vehicles, time they were entered, most recently posted, or any other suitable metric.

In another implementation, the system calculates suggested vehicles to pick up based on various information such as vehicles that might be along a route to a current drop off, learning the driving patterns of the transporter, figuring out the most money the transporter could make, factoring in the transporter's preferences, factoring in the number of available spots open on the transporters truck or any other suitable method. The system may display these to the transporter or send notifications when suggested ones are available.

In another implementation, the transporter is presented a map view of the available shipments to pick up, and the transporter can select them by clicking on the map. In this way, the transporter can visually determine which shipments are best to accept and pick up along a desired route.

In another implementation, the system provides incentives, such as increased pay, to transporters based on the amount of time an available load has been posted. This may help vehicles that have been sitting around for a while get picked up by transporters.

In one embodiment, the transporter is notified of a new shipment being posted. In another embodiment, the transporter is notified of any new shipment posted within a predetermined distance from the transporter. The transporter and/or administrator may be able to determine this distance. Other parameters for notification of new shipments may also be used, such as shipments going to a certain location, a certain amount of vehicles, or a certain payout amount, or whether the shipment needs an enclosed transport.

FIG. 17 illustrates an exemplary shipment details page of the mobile application. The shipment details screen shows the pick-up address, drop off address, the vehicles in the shipment, each vehicle showing details such as availability, whether it requires and enclosed transport, gate pass status, or any other suitable information. It may also show a map showing the pickup address, the drop off address and the route between the two. In one implementation, the map may be interactive, whereas the transporter may move it around, zoom in or zoom out. In one implementation, it may also show the time estimate for the trip and/or the miles between the pickup and drop off addresses. This page may also show a shipments button 1602, which would take the transporter back to the available shipments page shown on FIG. 16, or tap the loads button 1604 which was take the transporter to their in progress or completed loads shown below in FIGS. 18A-18B. Here, the transporter can tap the Accept Load button 1702 to accept the load for pick up. If the transport taps the accept load button 1702, the mobile application may display a second screen (not shown) showing similar information as the shipment details screen, but allowing the transporter to press a confirm button and in one implementation, pressing a button to accept terms and conditions. In one implementation, the terms and conditions acceptance are only displayed the first time a transporter accept a load.

Figure 18:
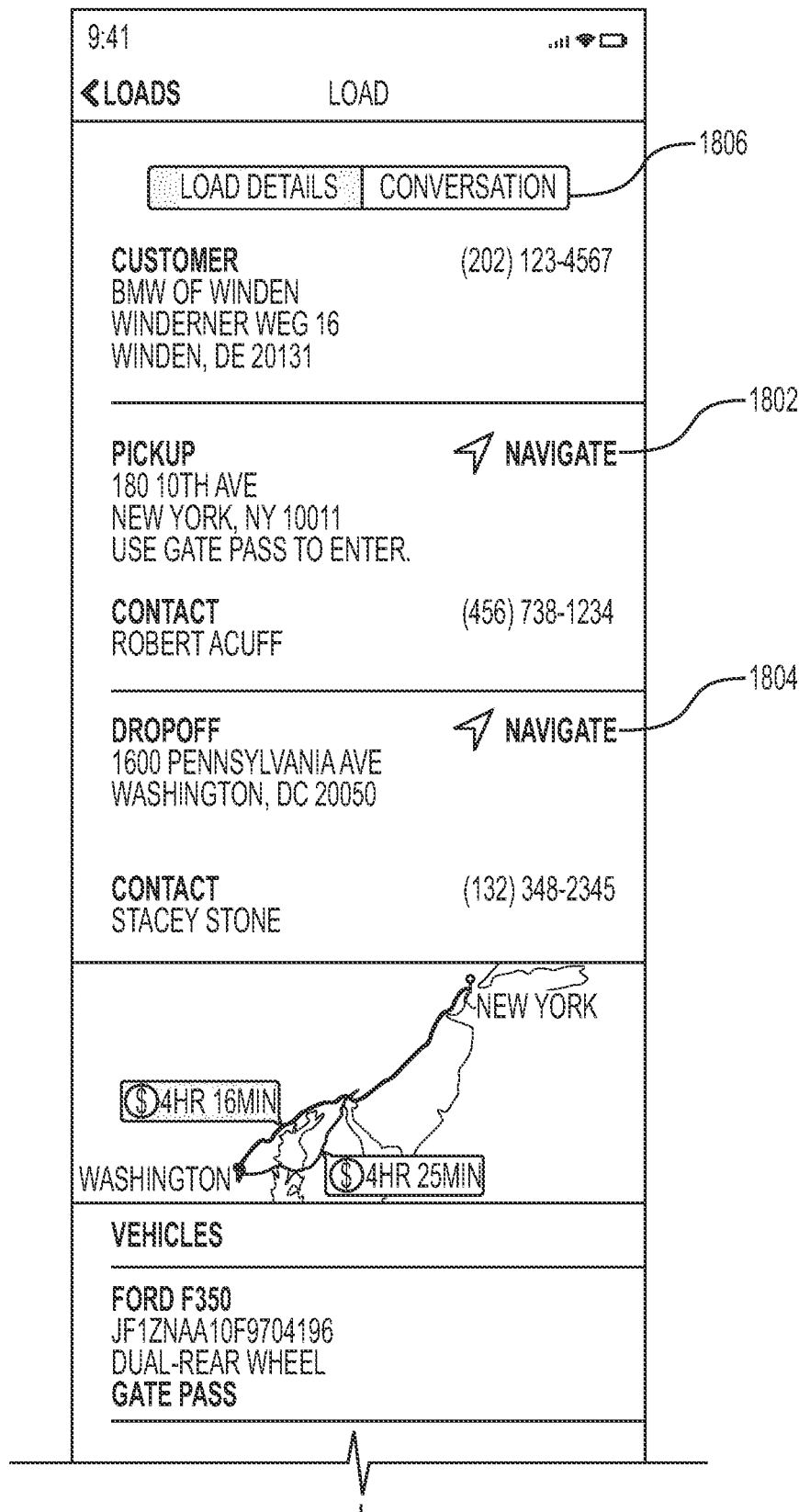
FIG. 18 illustrates an exemplary load details screen in the mobile app for the transporter.
Figure 18:
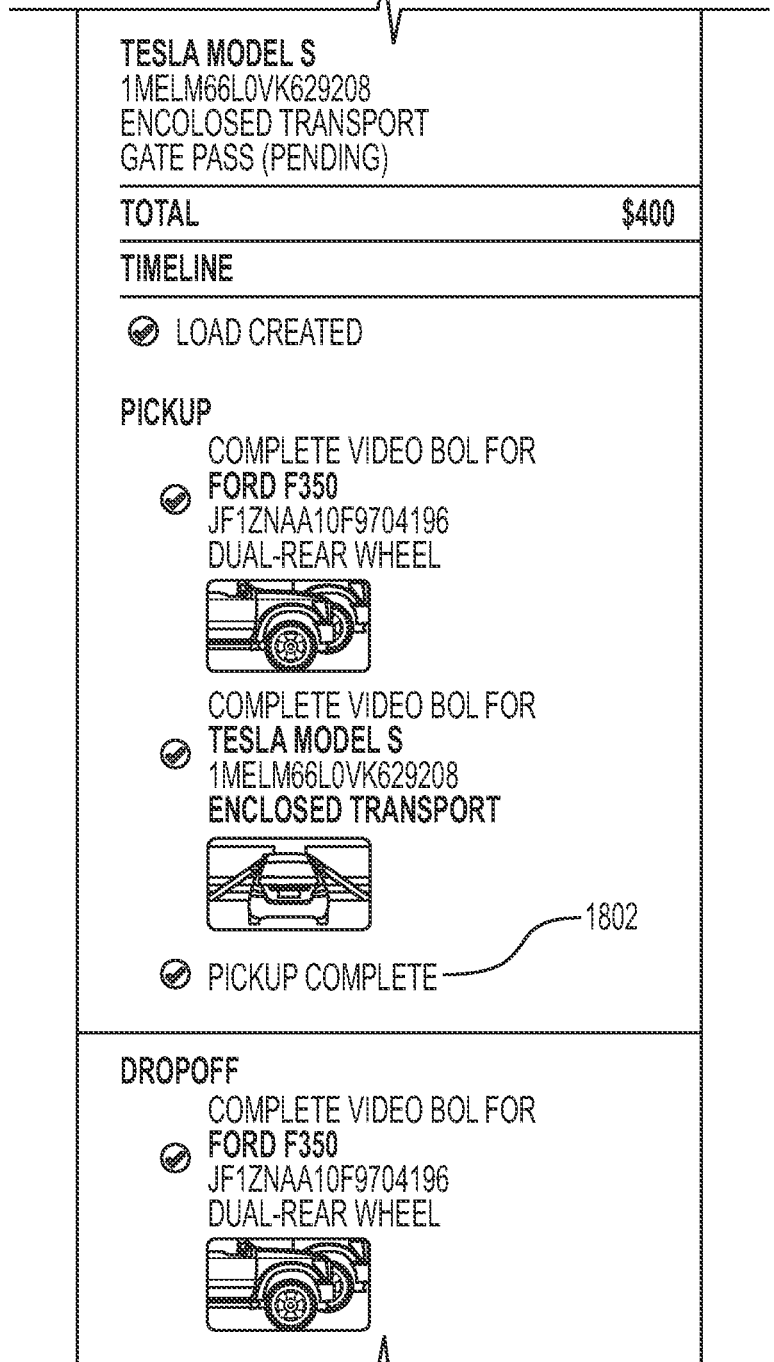
Figure 18:
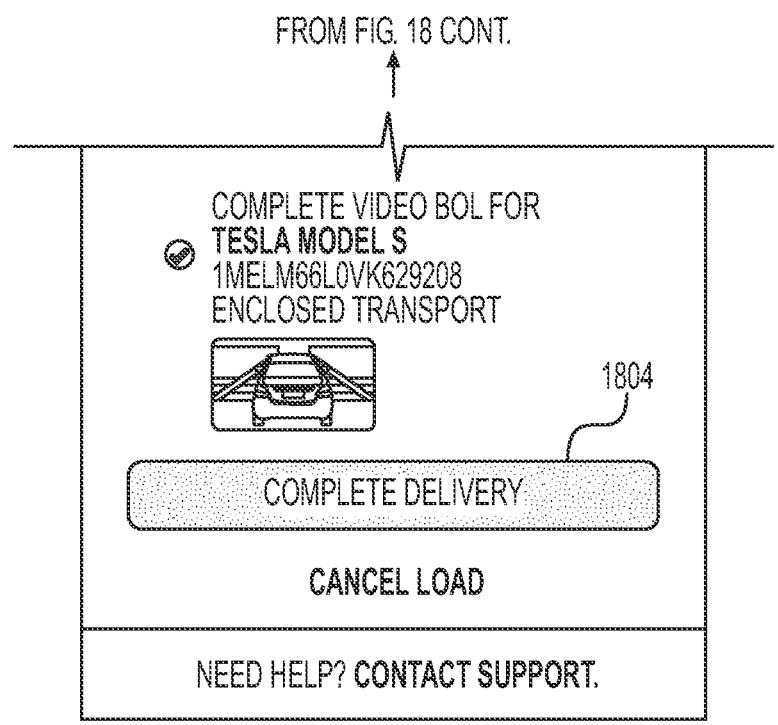

FIG. 18 illustrates an exemplary load details screen in the mobile app for the transporter. This screen may show details for the load, such as the customer name and information and phone number, the pick-up and drop off addresses, any pick up and drop off instructions, and the pick up and drop of contact names and numbers. They have an option to click the navigate button 1802 or 1804 to bring up a navigation map to the pickup address (not shown). They can also tap the contact's phone number to call or text the contact. A full view map showing the route may also be shown. The vehicles may also be list by the make, model, color, year, VIN, when they are available, if they have an approved or pending gate pass, and any additional comments. The total pay-out for that load is also listed.

Next, the timeline for the order is detailed out as shown on FIG. 18. This shows that the load was created, and that the video BOL was completed for a specific vehicle with the make, model and VIN number. In one implementation, the BOL is a video BOL. When a load is begin picked up, the mobile application has a button the transporter may press to take a video of the condition of the car. When making this video, the transporter may walk around the car and go inside the car to show the condition of the car. The transporter may also verbally point out any known damage on the video, or the app may have a text box (not shown) for entering this information. This video walk around may be attached for each vehicle at inspection before loading onto the truck. If the video BOL is not attached, the transporter has the opportunity to add the BOL to that vehicle on the load details screen. In one implementation, the video BOL should be attached to each vehicle in the load. The checkmark next to pick up complete 1802 appears once that process is completed.

The drop-off details list which vehicles were dropped off and the option to add the video BOL is there for the drop off. The transporter takes the video BOL of the car upon drop off to document the condition of the car upon drop off. In one implementation, the transporter will not be able to confirm pickup or drop-off of each vehicle without taking the respective video BOL.

The system stores an executed copy of the video BOL. The video BOL can be done quickly, and easier and provide more accuracy than conventional BOL's. In the event that a dispute arises regarding whether vehicle was damaged or otherwise harmed while in transport, the extent of such damage or blemish, if any, and the party at fault, if any, may be ascertained by comparing the first video (recorded at point of origin) with the second video (recorded at destination). This is a valuable aid in preventing and resolving disputes, having the potential to reduce property casualty insurance costs and litigation costs.

Once the delivery is complete, the transporter may select complete delivery 1904. In order to complete a load, the transporter may first type their full name and then sign with their finger on the smart phone to complete the load. Optionally, this confirmation may be done without a written signature with other methods such as biometric identification, such as facial recognition, fingerprint recognition, or any other suitable verification method.

Optionally, the transporter can also cancel the load from this page. If they need additional support, there is a link at the bottom of that screen for support.

In one implementation, the transporter can tap the conversation button 1806 to access the chat functionality to communicate or see conversation that has occurred on that particular load between the parties.

Figure 19:
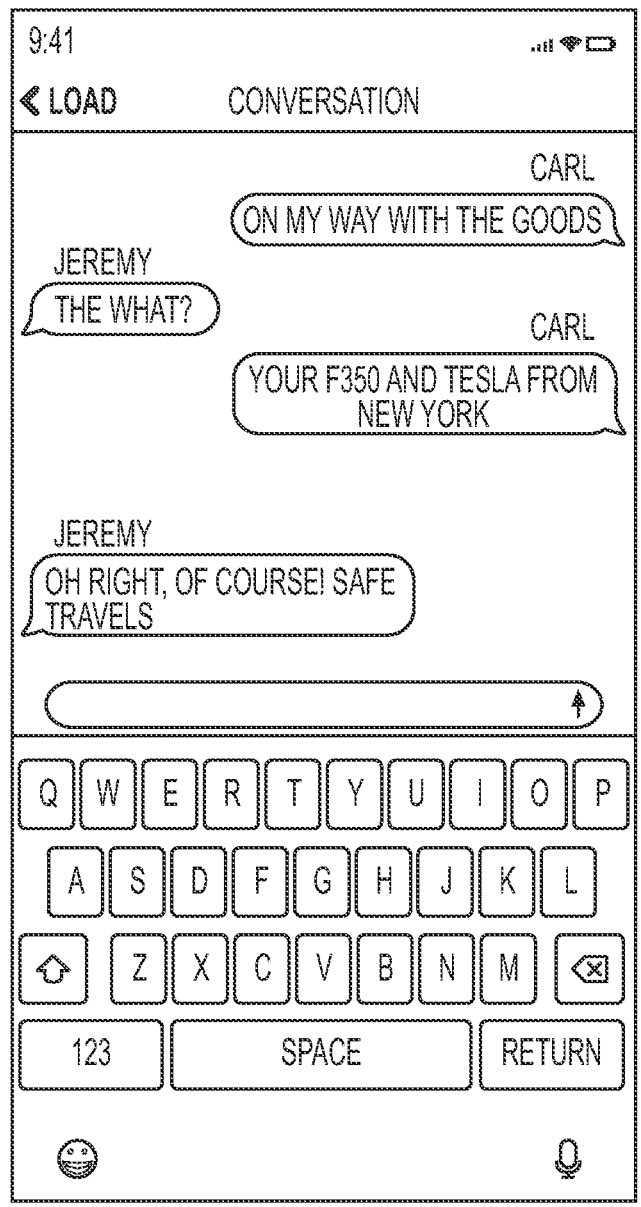
FIG. 19 shows a chat function in the mobile app.

FIG. 19 shows a chat function in the mobile app. Within the mobile app, the transporter is able to communicate with those involved in the order of the load. Throughout the process, the transporter has direct access to the dealer (and/or admin) on the order and can hold a conversation within that specific order. This may be helpful for quick communication regarding any issues.

Figure 20:
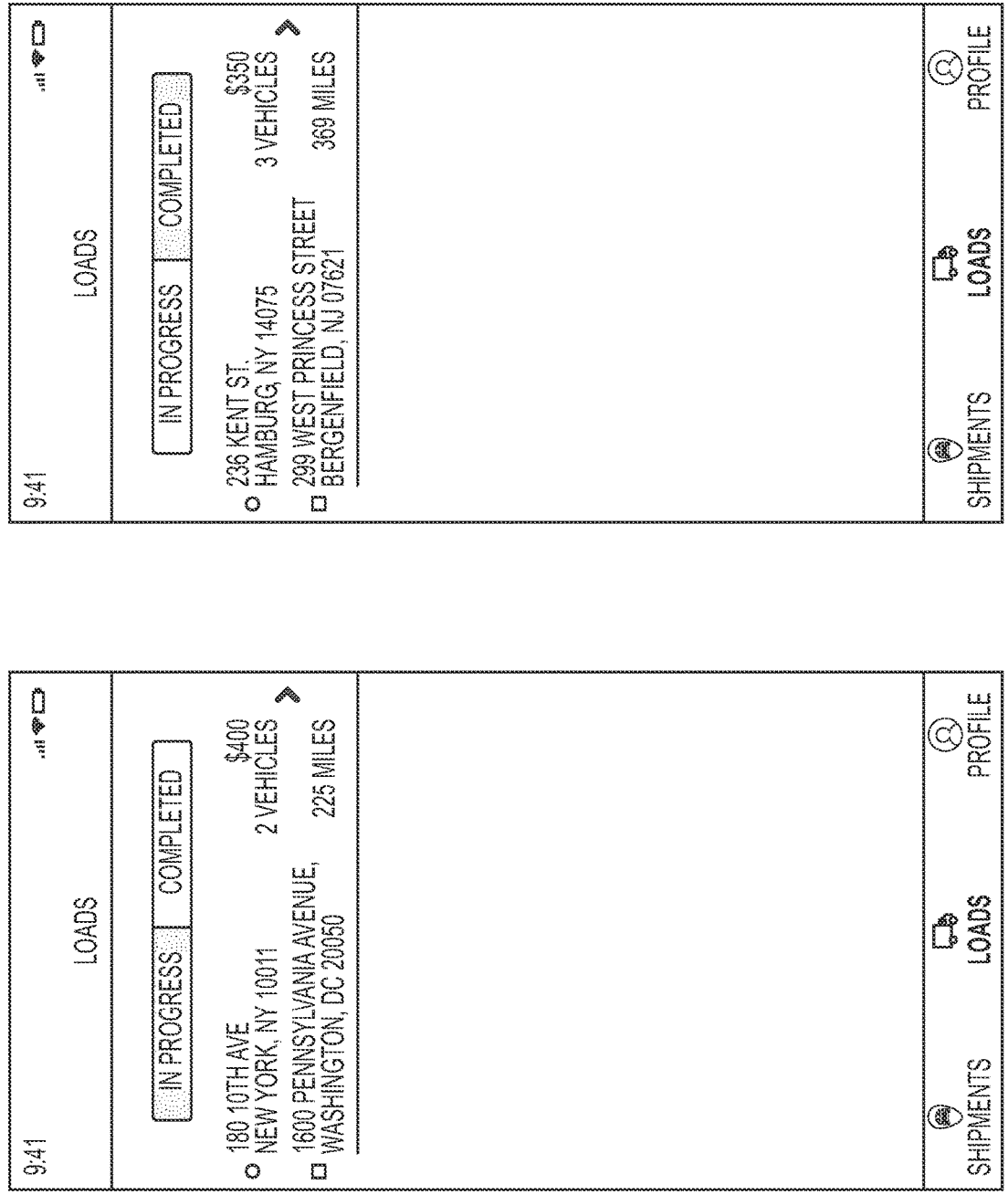
FIGS. 20A-20B illustrate the loads in progress and completed loads screens.

FIGS. 20A-20B illustrate the loads in progress and completed loads screens. This page is accessed by hitting the loads button on the top left of the load details screen of FIG. 18, or the loads 1604 button on FIGS. 16-17. The transporter may toggle between a list of the loads in progress and completed loads by tapping the in-progress tab or the completed tab. Each of those will show the pickup and drop-off address, the amount to be paid, the number of vehicles in that load and the distance between the pickup and drop off addresses. When a given load is in either screen is tapped by the transporter, the mobile application displays the load details screen as shown in FIG. 18. A completed load's detail screen may also show additional suitable information such as the pay-out amount to the transporter.

When a load is completed, the system may automatically electronically pay the transporter through payment information supplied by the transporter to the system. In one implementation, this payout is approved by an administrator before paying directly to the transporter.

When the load is completed, the user may optionally rate the transporter, for example, with a rating of one to five stars. This rating is displayed to administrators, and may be displayed to dealers. This rating can be used by administrators or dealers to, for example, only use good or highly rated transporters, or potentially deactivate the accounts of transporters whose ratings are consistently low.

Figure 21:
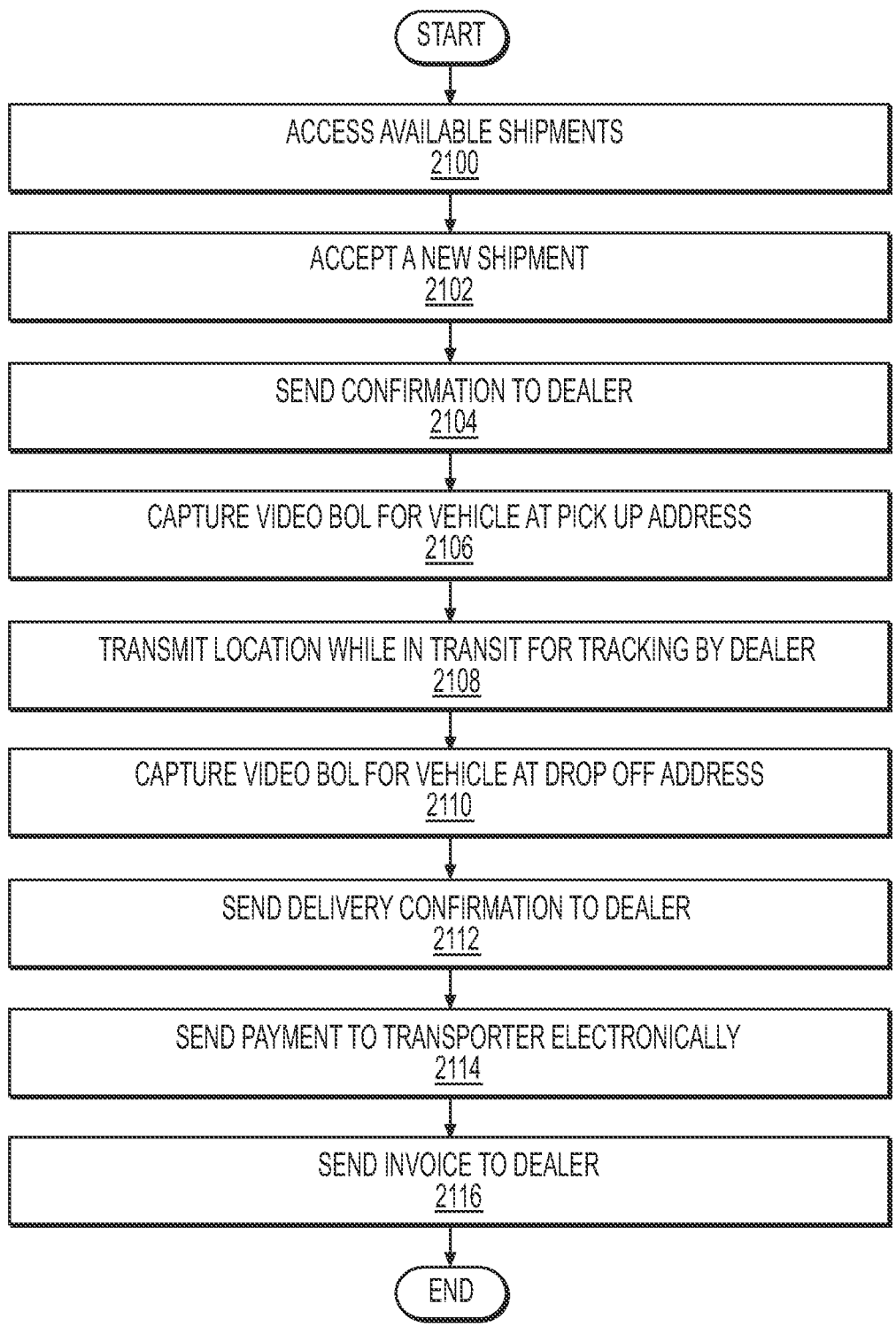
FIG. 21 is a flowchart illustrating a method for automated vehicle transportation for a transporter and transporter device 104.

FIG. 21 is a flowchart illustrating a method for automated vehicle transportation for a transporter and transporter device 104. First, a transporter accesses the available shipments screen in the mobile app on the transporter device 104 as shown on FIG. 17 (step 2102). The transporter then selects and accepts a shipment as shown on FIG. 18 (step 2102). The transporter may decide based on their own criteria, or the system may suggest a shipment for the transporter to accept. The system sends a confirmation of the acceptance to the dealer (2104).

The transporter drives to pick up the vehicle(s) in the shipment, and upon arrival, the transporter captures the video BOL for each vehicle (step 2106). Then the transporter drives to deliver the vehicle(s) and the transporter device 104 transmits the transporter's while in transit (2108) for display to the customer. This way, the user or dealer can know where their vehicles are automatically and accurately.

Next, upon arrival and delivery at the drop off address, the transporter may take another video BOL of the vehicle(s) which is uploaded to the system (step 2110). The transporter may get a signature to complete the delivery, or optionally complete the delivery without a signature. The system then sends a delivery confirmation to dealer (step 2112). If the dealer was not charged already, the system may then charge the dealer and send payment to the transporter electronically (2114). The system then then sends invoice to dealer (2116).

When a transporter first accesses the mobile app or website, the transporter will have the option to either login or create a new account (not shown). They may tap the sign up button to create the account. Once their account has been created, in one implementation, a screen may appear that it is pending verification. The transporter may be sent see a message that they will be informed as to when it has been approved. In the meantime, they may be taken through steps to complete their insurance information and set up their pay out method. Checkmarks may appear next to the steps that have been completed already. If the transporter has completed the steps necessary on their end and are just waiting for account admin verification, the screen may indicate that with checkmarks highlighted on what they have completed. The transporter does have the option to add their insurance information and pay out method later in the profile creation, but, in one implementation, they may not be able to accept a shipment until their account is complete and verified.

The system may also request their company name, their first and last name, their email address, phone number, and password. They may be requested to input their U.S. Department of Transportation (DOT) number, their address, and a message may be displayed that, by clicking the button, they agree to the terms and conditions and privacy policy. They may finalize it by pressing a create account button.

During the process, the transporter may be asked to add their insurance carrier information, their insurance policy number, Employer Identification Number (EIN) for payment processes and financial reporting. Within their profile, they can edit the information as well. In one implementation, before accepting any vehicles, the transporter must input their bank account information for payout. Once they have entered their information and their bank account has been verified, they will see a confirmation screen that shows the bank account connected. In one implementation, any other suitable method of payment may be used, such as credit cards, debit cards, mobile wallets, electronic systems such as Apple Pay, Samsung Pay, or any other electronic method of payment. This allows the system to make payouts for completed orders. The transporter may be asked to enable push notifications for the app so that they are alerted when an order request comes through, when they have a new message in their conversations, or if a gate pass has been uploaded.

Users or transporters may optionally be provided the ability to invite other team members from their companies.

In some embodiments, although shown above as the user entering the vehicle shipment information, the shipment information may also be imported automatically instead or in addition. For example, the system may receive the information on vehicles to ship directly from another computer system such as a dealer management system (DMS). This would reduce even the time of entry for someone automatically shipping vehicles. This may be done, for example, with integrating into the API's of the other system, such as a DMS system, into the server 108 or computer system 101.

The system may also provide a dealer with a summary of their transactions and invoices to assist with accounting.

In one embodiment, the system may be adapted for delivery of other transported items, such as horse transportation, to deliver horses instead of vehicles.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method in a data processing system for automated vehicle transportation, comprising:
   receiving, from a customer, vehicle information of a vehicle to be shipped, to be accepted on a mobile computing device by an automotive transport trucker to transport the vehicle, wherein the vehicle is suggested for acceptance by the automotive transport trucker based on predetermined criteria including an automotive transport truck availability;
   automatically transmitting the vehicle information to the mobile computing device of the automotive transport trucker for acceptance for transport by the automotive transport trucker;
   receiving an indication of acceptance to transport the vehicle by the automotive transport trucker provided on the mobile computing device; and
   obtaining a video of the vehicle using a camera of the mobile computing device to create a video bill of lading (BOL), wherein the automotive transport trucker is prompted to provide input descriptive of a damage condition of the vehicle, and wherein the input is received from the automotive transport trucker and is associated with the video BOL.

2. The method of claim 1, further comprising:
   receiving location information of the mobile computing device of the automotive transport trucker comprising a location of the mobile computing device that is determined using a global positioning system;
   transmitting the location information of the mobile computing device of the automotive transport trucker to the customer; and
   displaying the location information of the mobile computing device of the automotive transport trucker to the customer.

3. The method of claim 1, further comprising: automatically determining a suggestion of a second vehicle for the automotive transport trucker to accept for transport during transport of the vehicle based on predetermined criteria, wherein the predetermined criteria include selecting the second vehicle to maximize a payout amount to the automotive transport trucker based on a price per mile of transporting the vehicle and the second vehicle in a same shipment and based on pick-up and delivery locations of the vehicle in combination with the second vehicle.

4. The method of claim 1, wherein the predetermined criteria further comprise one or more of: a current number of available spots open on a transporter vehicle of the automotive transport trucker, a predicted available spot open on the transporter vehicle during a return trip, observed driving patterns of the automotive transport trucker, predetermined preferences of the automotive transport trucker, and a distance between the mobile computing device and the vehicle.

5. The method of claim 1, further comprising:
   receiving payment for the transport from the customer electronically; and
   electronically transmitting a payout to the automotive transport trucker.

6. The method of claim 1, further comprising:
   automatically determining a price to display and charge the customer; and
   automatically determining a payout amount to electronically pay the automotive transport trucker.

7. The method of claim 6, wherein the price to charge the customer is increased based on an amount of time that the vehicle has been posted by the customer as available.

8. The method of claim 1, wherein the vehicle information further comprises a Vehicle Identification Number (VIN), an origin address, and a destination address.

9. The method of claim 1, further comprising:
   receiving, by a server, the video BOL of the vehicle from a network interface of the mobile computing device of the automotive transport trucker; and
   storing the video BOL of the vehicle.

10. The method of claim 1, further comprising displaying available vehicles for pick up to the automotive transport trucker sorted by distance from the mobile computing device and receiving acceptance of a displayed available vehicle selected by the automotive transport trucker for transport.

11. The method of claim 1, further comprising:
    receiving an electronic gate pass from the customer; and
    automatically transmitting the electronic gate pass to the mobile computing device of the automotive transport trucker.

12. The method of claim 1, further comprising:
    displaying a map view to the automotive transport trucker displaying a location of vehicles available for transport.

13. A data processing system for automated vehicle transportation, comprising:
    a memory configured to store instructions to cause a processor to:
    receive, from a customer, vehicle information of a vehicle to be shipped, to be accepted on a mobile computing device by an automotive transport trucker to transport the vehicle, wherein the vehicle is suggested for acceptance by the automotive transport trucker based on predetermined criteria including an automotive transport truck availability;
    automatically transmit the vehicle information to the mobile computing device of the automotive transport trucker for acceptance for transport by the automotive transport trucker;
    receive an indication of acceptance to transport the vehicle by the automotive transport trucker provided on the mobile computing device; and
    obtain a video of the vehicle using a camera of the mobile computing device to create a video bill of lading (BOL), wherein the automotive transport trucker is prompted to provide input descriptive of a damage condition of the vehicle, and wherein the input is received from the automotive transport trucker and is associated with the video BOL.

14. The data processing system of claim 13, wherein the instructions further cause the processor to:
    receive location information of the mobile computing device of the automotive transport trucker comprising a location of the mobile computing device that is determined using a global positioning system;

transmit the location information of the mobile computing device of the automotive transport trucker to the customer; and display the location information of the mobile computing device of the automotive transport trucker to the customer.

15. The data processing system of claim 13, wherein the instructions further cause the processor to: automatically determining a suggestion of a second vehicle for the automotive transport trucker to accept for transport during transport of the vehicle based on predetermined criteria, wherein the predetermined criteria include selecting the second vehicle to maximize a payout amount to the automotive transport trucker based on a price per mile of transporting the vehicle and the second vehicle in a same shipment and based on pick-up and delivery locations of the vehicle in combination with the second vehicle.

16. The data processing system of claim 13, wherein the predetermined criteria further comprise one or more of: a current number of available spots open on a transporter vehicle of the automotive transport trucker, a predicted available spot open on the transporter vehicle during a return trip, observed driving patterns of the automotive transport trucker, predetermined preferences of the automotive transport trucker, and a distance between the mobile computing device and the vehicle.

17. The data processing system of claim 13, wherein the instructions further cause the processor to:
receive payment for the transport from the customer electronically; and
electronically transmit a payout to the automotive transport trucker.

18. The data processing system of claim 13, wherein the instructions further cause the processor to:
automatically determine a price to display and charge the customer; and
automatically determine a payout amount to electronically pay the automotive transport trucker.

19. The data processing system of claim 18, wherein the price to charge the customer is increased based on an amount of time that the vehicle has been posted by the customer as available.

20. The data processing system of claim 13, wherein the vehicle information further comprises a Vehicle Identification Number (VIN), an origin address, and a destination address.

* * * * *